Figure 1:
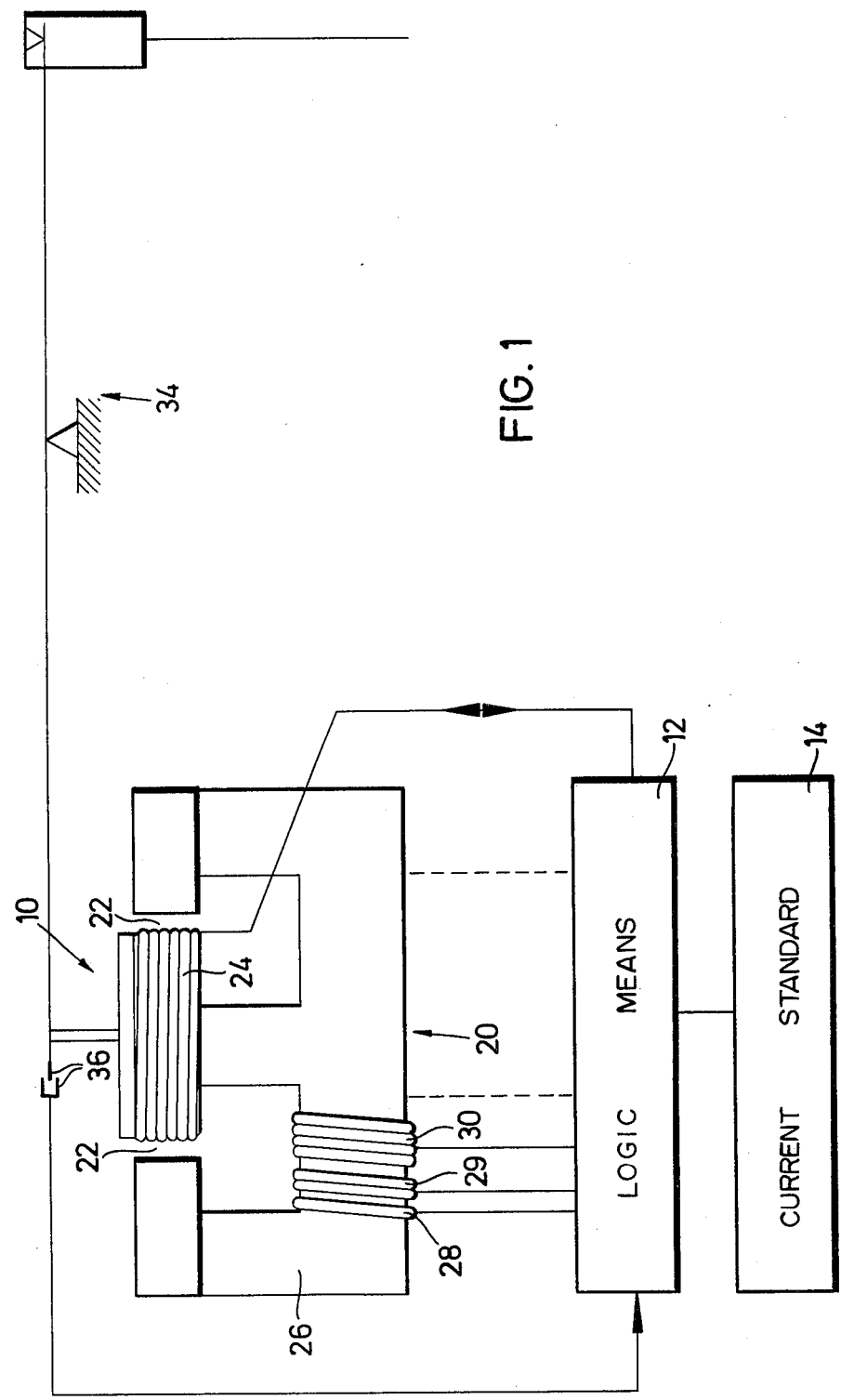

United States Patent [19]
Knothe et al.

[11] 4,004,458
[45] Jan. 25, 1977

[54] ELECTROMAGNETICALLY COMPENSATED BALANCE OR DYNAMOMETER

[75] Inventors: Erich Knothe, Eddigehausen; Franz Josef Melcher, Ellierode; Christoph Berg, Gottingen, all of Germany

[73] Assignee: Sartorius-Werke GmbH (und. vorm. Gottinger Prazisionswaagenfabrik GmbH), Gottingen, Germany

[22] Filed: Mar. 5, 1976

[21] Appl. No.: 664,416

[30] Foreign Application Priority Data

Mar. 13, 1975 Germany ............................ 2511103

[52] U.S. Cl. ................................ 73/141 R; 310/13
[51] Int. Cl.² ........................................... G01L 1/00
[58] Field of Search ............ 73/141 R; 310/14, 23, 310/30, 13

[56] References Cited
UNITED STATES PATENTS 3,372,579   3/1968   Hobel et al. ...................... 73/141 R
3,551,790   12/1970   Shapiro et al. ............... 73/141 R X

*Primary Examiner*—Jerry W. Myracle
*Attorney, Agent, or Firm*—Browdy and Neimark

[57] ABSTRACT

A balance or dynamometer which comprises a coil in the work gap of an electromagnet having a core provided with discrete groups of turns, the number of ampere turns in the groups of turns corresponding to the sequence or code values of a preselector code, the coil and electromagnet being disturbed from a predetermined position relative to each other under the influence of a force; such disturbance being recorded by a position indicator connected to the input of a forward/backward counter; means for arranging that the number registered in the counter at any one time connects an associated number of groups of turns to a constant current source connected to the coil; the coil and electromagnet returning to said predetermined position when the counter has connected an appropriate number of groups of turns to the constant current source to compensate for the disturbing force.

11 Claims, 2 Drawing Figures

ELECTROMAGNETICALLY COMPENSATED BALANCE OR DYNAMOMETER

The invention relates to an electromagnetically compensated balance or dynamometer having a coil provided in the work gap of a magnet, either said coil or magnet being movable and being deflected out of a predetermined equilibrium position relative to the unmovable one of the magnet or coil under the influence of a force.

In a known balance or dynamometer of this type (GB-PS No. 1,362,770), the impulses of a cyclic oscillator are passed through to the counter during the time of the deflection. The outputs of the counter are coded according to the BCD code and subdivided into decades. A digital-analog converter is associated with the outputs of each decade, which generates, as a function of the digital signal, an analog signal in the form of a compensation current which is fed to an associated compensation coil of an electromagnetic/mechanical transducer. The digital signals delivered to the converters are simultaneously tapped for measuring evaluation.

In this known balance or dynamometer, just as in other known electromagnetically compensated balances or dynamometers, the elctromagnetic/mechanical transducer is a permanent magnet and the coil is positioned in the air gap thereof. In the present invention the work coil is simply subdivided into a plurality of individual coils which are dimensioned as a function of the decade with which they are associated. Whereas, in the case of this known device also, the work coil carries a direct current proportional to the force exerted on it at the end of the compensation process.

In the known device, therefore, both an analog/digital conversion in the region of the position indicator and also a digital/analog conversion between the counter and the electromagnetic/mechanical transducer take place in the control circuit. Although this obviates the measured quantity being digitalised as a voltage outside the control circuit and separate analog/digital converters and additional errors being introduced by this external conversion, which cannot be detected and corrected by the control circuit itself; nevertheless, this merely shifts the difficulty from the previous analog/digital converter leading out of the control circuit, to the three juxtaposed digital/analog converters. In this case, so as not to falsify the result, the digital/analog converter of the highest ranking decade must exhibit an error of not more than one digital step of the lowest ranking decade. This necessitates a particularly high outlay, for example due to the temperature behaviour and the drift behaviour of the components in the digital/analog converters of the higher ranking decade.

In this context it must be remembered that, for balances or dynamometers of the type initially defined, a resolution which is definitely better than $10^5$ steps is a desideratum.

The aim of the invention is to develop a balance or dynamometer of the type initially defined which permits a resolution and linearity comparable with high percision mechanical measuring systems, whilst it retains the advantages of the known electromagnetic/electronic systems, namely objective detection of measured values and analog or digital display of the measured values compared to subjective evaluation and much higher measuring speed (better than 0.5 seconds compared with 5 to 30 seconds).

In order to achieve this aim the invention provides a balance or dynamometer which comprises a coil disposed in the work gap of a magnet, said magnet being an electromagnet having a soft magnetic core provided with discrete groups of turns, the number of ampere turns in the groups of turns corresponding to the sequence of code values of a preselected code, either said coil or magnet being movable and being deflected out of a predetermined equilibrium position relative to the unmovable one of the magnet or coil under the influence of a force, a position indicator, logic means including a counter, the input of the counter being connected to the position indicator and the output of the counter being connectable to selected ones of the groups of turns to provide a concordance between the count held in the counter and the number of ampere turns in the selected group of turns, and a constant current source; the position indicator; in the presence of a deflection, controlling the counter as a function of the direction of deflection, and the logic means connecting the output of the constant current source to the coil and to the particular groups of turns associated with the count held in the counter whereby the deflection is compensated and the movable one of the magnet or coil is returned to its predetermined equilibrium position and the final count held in the counter is proportional to the magnitude of the force.

According to a preferred embodiment there is provided a balance or dynamometer, wherein, in the presence of a deflection, the position indicator connects the output of a cyclic oscillator, as a function of the direction of deflection, to the forward or backward input of a coded forward/backward counter, the outputs of which counter are associated with the digits of a specific code, and the logic means comprises switch means wherein switches are respectively connected to individual groups of turns, each switch being controlled by an associated one of the coded outputs of the forward/backward counter.

An essential advantage of the invention is that the electromagnetic/mechanic transducer itself is used directly for the digital/analog conversion and the precision of the measurements and indications are determined by the number of turns and the ratio of the ampere-turns which are absolutely constant among themselves. This produces a number of essential advantages.

One of these advantages is that the precision of the measurement is independent of the ambient temperature and humidity and of long term effects such as drifts, because the number of turns and the proportional ratio of the turns cannot be influenced by these factors.

Another advantage which is obtained is that the range of measurement can be enlarged in a simple manner, by providing a correspondingly greater number of groups of turns. For example, for a measured value resolution of better than 130,000 steps, 17 coils are sufficient if the binary code is employed, and 11 coils if the ternary code is employed.

With the construction according to the invention, it is not the intensity of the current flowing through the compensation coil, but the number of ampere-turns in the electromagnet which is modified in order to compensate the force exerted on the work coil.

Another advantage results from the fact that the ageing phenomena which appear in the permanent magnets of the known balances or dynamometers are eliminated by the use of a controlled electromagnet.

The switches are preferably two-position selector switches which alternatively connect their associated groups of turns to the constant current source or bypass them, as a function of the count in the counter. By this means it is possible for example to adjust any number lying between the code values of the ternary code in that corresponding groups of turns carry the constant current in the one or other current flow direction, i.e. are added or subtracted.

In a preferred further development of the invention, the position indicator exhibits two directional outputs, each of which is amplified and then connected to separate AND-gates, a second input of each AND gate being connected to the output of the cyclic oscillator, and the output of each AND gate being connected to the forward or backward input of the forward/backward counter.

In an advantageous further development, the code of the counter outputs corresponds to the code of the groups of turns, which may be the binary code, BCD code or ternary code.

According to a further embodiment, if the ternary code is used as the code of the groups of turns, the counter is constructed in the ternary code or a binary/ternary code convector is inserted between the counter and the group of switches.

It is also preferred that the logic means switches over in large steps between the higher ranking coded groups of turns in the case of a deflection exceeding a preselected value, and in small steps for a deflection not exceeding the preselected value.

In a high precision of measurement is required irrespectively of location, then the output of the constant current is preferably controlled by a reference standard.

In another preferred embodiment the groups of turns of the lowest ranking decade exhibit a number of turns higher by a preselected factor, while a fixed fraction of the constant current equal to the reciprocal of this factor is fed to these groups of turns.

Figure 2:
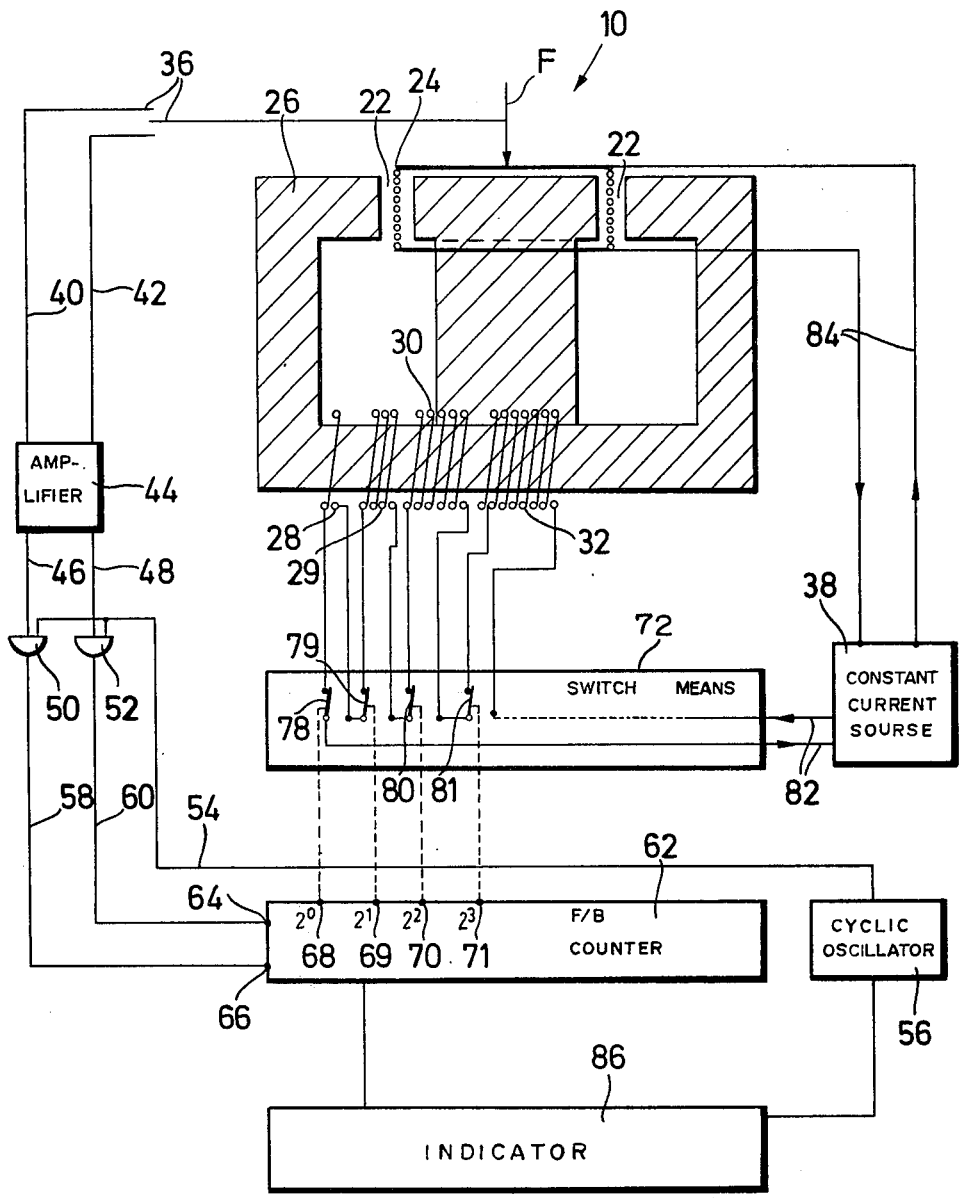

Preferred embodiments of the invention will now be described with reference to the accompanying schematic drawings, wherein:

FIG. 1 shows a block circuit diagram of the eletromagnetic and electronic section of an electromagnetically compensated balance or dynamometer according to the invention, in which the mechanical section is indicated schematically, and FIG. 2 shows a more highly detailed block circuit diagram of the electronic section of the device.

According to the drawing, the electromagnetic section 10 of an electromagnetically compensated balance or dynamometer comprises a compensation coil 24 in the air gap 22 of a magnet 20.

As shown schematically in FIG. 1, the compensation coil 24 is connected to the movable part of the balance or dynamometer. A position indicator 36 is connected to the compensation coil 24 which indicates whether the compensation coil 24 occupies a preadjusted equilibrium position in the air gap 22 of the magnet arrangement 20 or has been deflected from said position under the influence of a force.

The magnet 20 is constructed as a controllable electromagnet comprising a soft iron core 26 fitted with discrete groups of turns 28, 29, 30, 32.

The number of ampere turns of the groups of turns 28, 29, 30, 32 illustrated in the drawing correspond to the sequence of the digits of the binary code 1, 2, 4, 8 ... In the drawing only three or four groups of turns are illustrated. 17 groups of turns are provided when a resolution of measured values of approximately 130,000 steps is desired, using the BCD code. Instead of the BCD code, it is also possible to adopt the ternary code $3^n$. In this case only 11 groups of turns are necessary for the same resolution. The embodiment illustrated in the drawing is designed for the BCD code.

As shown schematically in FIG. 1, the individual groups of turns 28, 29, 30 are connected to a logic means 12, to which a wire of the position indicator 36 leads.

The logic means 12 is also connected to a current standard 14 which may also comprise a constant current source 38 (see FIG. 2) optionally derived from a reference standard.

The logic means 12 connects the current standard 14 to the compensation coil 24 and, as a function of the count held in the counter when a deflection occurs, the groups of turns 28, 29, 30, 32 associated with that number. For example, if the registered count is 6, then the logic means 12 connects the current standard 14 to the groups of turns 29 and 30 and the compensation coil 24 simultaneously. According to FIG. 1 the logic means 12 connects the sense of turns and the compensation coil independently of one another to the current standard, whereas according to FIG. 2 the compensation coil 24 is connected to the constant current source 38 and to all the groups of turns 28, 29, 30 and 32, and is thus connected in series with the latter and with the constant current source 38. However such a series connection is not essential to the invention. The essential point is that a current at constant intensity is fed both to the compensation coil 24 and also to the groups of turns 28, 29, 30, 32 of the controlled electromagnets 20. In this respect the constant current fed to the compensation coil 24 may differ in its current intensity from the constant current fed to the groups of turns 28, 29, 30 and 32, provided that these two currents themselves remain permanently constant in their intensity.

A separate feeding of the constant current to the compensation coil 24 and to the groups of turns 28, 29 30 and 32 is necessary for example, if the numbers of turns of the groups of turns 28, 29, 30 and 32 corresponds to the sequence of digits of the ternary code 1, 3, 9, 27 ... $3^n$. In this case it is necessary for the constant current to be made to flow through the individual groups of turns in alternative directions as a function of the particular compensation required, so as to enable all whole numbers to be realised.

FIG. 2 illustrates the electronic section of the balance or dynamometer belonging to the logic means 12 and to the current standard 14 in greater detail.

According to FIG. 2, two directional output wires 40 and 42 are connected to the position indicator 36, each of which is connected to a particular input of an amplifier 44. Each of the two output wires 46 and 48 of the amplifier 44 is connected to the input of a particular AND-gate 50 or 52, whilst the other input of the two AND-gates 50 and 52 is connected to the output wire 54 of a cyclic oscillator 56 delivering impulses at a fixed frequency. The output of each AND-gate 50 and 52 leads by a wire 58 or 60 to an input of a forwards/backward (F/B) counter 62. The wire 60 is connected to the forward input 64 and the wire 58 to the backward input 66 of the F/B counter 62.

The outputs 68, 69, 70, 71 of the F/B counter 62 correspond to the sequence of digits of the binary code $2^0, 2^1, 2^2, 2^3$ . . . and are grouped in accordance with the BCD code, namely $2^0, 2^1, 2^2, 2^3, 2^0 \times 10, 2^1 \times 10, 2^2 \times 10 \, 2^3 \times 10$ . . .

The coded outputs 68, 69, 70, 71 of the F/B counter 62 are connected so as to control two-position selector switches 78, 79, 80 or 81 respectively of the switch means 72. Then when a signal appears at one of the coded outputs 68, 69, 70, 71 the associated switch 78, 79, 80 or 81 is moved into the position in which the associated group of turns 28, 29, 30 or 32 is connected in to the constant current circuit. The switch drops back into the other position, in which it by-passes its associated group of turns, as soon as the signal appearing at the output disappears.

The switch means 72 is connected by a main current wire 82 to the constant current source 38.

The switches 78, 79, 80, 81 are connected with their terminals in series with the associated groups of turns, as shown in FIG. 2.

The compensation coil 24 is connected by a wire 84 to the constant current source 38.

Also according to FIG. 2, a memory and indicator arrangement 86 is provided which comprises a memory, a code converter and a weight evaluator. The cyclic oscillator 56 serves simultaneously as control counter for the F/B counter 62. The code converter converts the coded number written into the memory into a decimal number which is fed to the weight evaluator. The weight evaluator may have a digital indication and/or a connection for an evaluating computer or process calculator.

The embodiment illustrated in FIG. 2 operates in the following manner:

When the compensation coil 24 is deflected downwards (as considered in the drawing) in the air gap by a force F exerted on it, the position indicator 36 indicates this deflection directionally, i.e. it delivers a signal by the wire 42 which is amplified in the amplifier 44 and fed from there by the wire 48 to the AND-gate 52. Because the one input of the AND-gate 52 is energised through the wire 48, and the other input is simultaneously energised with impulses from the cyclic oscillator 56 along the wire 54, the output of the AND-gate 52 is opened and the impulses can pass along the wire 60 to the forward input 64 of the F/B counter 62. As a function of the registered number of impulses having reached the forward input 64, there appear at the coded outputs 68, 69, 70 and 71 of the F/B counter 62 signals which cause the closure of the switches 78, 79, 80 and 81 so that the constant current can flow along the main wire 82 through the closed switches and their associated groups of turns 28, 29, 30, 32 and also through the compensation coil 24 to the other pole of the constant current source 38. This generates a compensation force acting upon the compensation coil 24, which counteracts the deviation. The compensation force is increased until the compensation coil 24 again occupies its equilibrium position —i.e. the force attacking it has been compensated. Simultaneously, the number registered in the F/B counter 62 up to the final compensation is written in the memory and fed through the code converter to the evaluator device.

In the equilibrium position itself, the position indicator 36 delivers no signal, so that both AND-gates 50 and 52 remain blocked and therefore no impulses of the cyclic oscillator can reach the F/B counter.

If an over-compensation should occur during the compensation process, then the position indicator 36 delivers through its other wire 40 a corresponding signal which, through the amplifier 44 and the wire 46, opens the AND-gate 50, through which the impulses of the cyclic oscillator then reach the backward input 66 of the F/B counter 62 and reduce the count registered in the latter until the over-compensation is cancelled.

The compensation process is thus completed after the decay of the transient process. The circuit illustrated is of course executed so that the count registered in the F/B counter 62 is fed to the memory and code converter 86 only after the transient process, including any possible over-compensation, is completed.

It is also possible in the case of the embodiment illustrated in the drawing to provide a device which automatically influences the switch group 72, so that the latter switches over the coded groups of turns in larger steps, for example decade steps, between the higher ranking coded groups of turns in the case of a deflection exceeding a preselected value, and in small steps, e.g. by increasing or reducing the number of turns only by one unit at a time, for a deflection not exceeding the preselected value.

Mechanical, electrical or electronic switches may be used in which the required function (on-off, selection-off) are controllable by signal impulses. The word "electromagnet" in line 3 of the main claim includes a controllable device.

We claim:

1. An electromagnetically compensated balance or dynamometer which comprises a coil disposed in the work gap of a magnet, said magnet being an electromagnet having a soft magnet core provided with discrete groups of turns, the number of ampere turns in the groups of turns corresponding to the sequence of code values of a preselected code, either said coil or magnet being movable and being deflected out of a predetermined equilibrium position relative to the unmovable one of the magnet or coil under the influence of a force, a position indicator, logic means including a counter, the input of the counter being connected to the position indicator and the output of the counter being connectable to selected ones of the groups of turns to provide a concordance between the count held in the counter and the number of ampere turns in the selected groups of turns, and a constant current source; the position indicator; in the presence of a deflection, controlling the counter as a function of the direction of deflection, and the logic means connecting the output of the constant current source to the coil and to the particular groups of turns associated with the count held in the counter whereby the deflection is compensated and the movable one of the magnet or coil is returned to its predetermined equilibrium position and the final count held in the counter is proportional to the magnitude of the force.

2. A balance or dynamometer according to claim 1, wherein, in the presence of a deflection, the position indicator connects the output of a cyclic oscillator, as a function of the direction of deflection, to the forward or backward input of a coded forward/backward counter, the outputs of which counter are associated with the digits of a specific code, and the logic means comprises switch means wherein switches are respectively connected to individual groups of turns, each switch being controlled by an associated one of the coded outputs of the forward/backward counter.

3. A balance or dynamometer according to claim 2, wherein the switches are two-position selector switches which alternatively connect their associated groups of turns to the constant current source or by-pass them as a function of the count in the counter.

4. A balance or dynamometer according to claim 2, wherein the position indicator exhibits two directional outputs, each of which is amplified and then connected to separate AND-gates, a second input of each AND gate being connected to the output of the cyclic oscillator, and the output of each AND gate being connected to the forward or backward input of the forward/backward counter.

5. A balance or dynamometer according to claim 1, wherein the selected code for the groups of turns is binary code ($2^n$), BCD code ($2^0, 2^1, 2^2, 2^3, 10 \times 2^0, 10 \times 2^1, 10 \times 2^2, 10 \times 2^3, 10^2 \times 0 \ldots$), or ternary code ($3^n$).

6. A balance or dynamometer according to claim 5, wherein the code of the counter outputs corresponds to the code of the groups of turns.

7. A balance or dynamometer according to claim 5, wherein between the counter and the groups of turns is provided a code converter which adapts the code of the counter ouputs of the code of the groups of turns.

8. A balance of dynamometer according to claim 1, wherein the logic means switches over in large steps between the higher ranking coded groups of turns in the case of a deflection exceeding a preselected value, and in small steps for a deflection not exceeding the preselected value.

9. A balance or dynamometer according to claim 1, wherein the output of the constant current source is controlled by a reference standard.

10. A balance or dynamometer according to claim 1, wherein the groups of turns of the lowest ranking decades exhibit a number of turns higher by a preselected factor and a fixed fraction of the constant current equal to the reciprocal of this factor is fed to them.

11. In an electromagnetically compensated balance or dynamometer having a coil disposed in the work gap of a magnet, either said coil or magnet being movable and being deflected out of a predetermined equilibrium position relative to the unmovable one of the magnet or coil under the influence of a force, and a position indicator which, in the presence of a deflection, controls a counter as a function of the direction of deflection, the output signals of said counter returning the coil or magnet to said predetermined equilibrium position, the improvement which comprises providing a constant current source, a cyclic oscillator, and a plurality of two position selector switches, said counter being a forward/backward counter and said magnet being an electromagnet having a soft core provided with discrete groups of turns, the number of ampere turns corresponding to the sequence of code values of a preselected code; the position indicator, in the presence of a deflection, connecting the output of the cyclic oscillator, as a function of the direction of deflection, to the forward or backward input of the coded forward/backward counter, the ouputs of which counter are associated with the digits of a specific code, the two position selector switches being respectively connected to individual groups of turns, each switch being controlled by an associated one of the coded outputs of the forward/backward counter and which connect their associated groups of turns to the constant current source or by-pass them as a function of the count in the counter, whereby the deflection is compensated and the moveable one of the magnet or coil is returned to its predetermined equilibrium position and the final count held in the counter is proportional to the magnitude of the force.

* * * * *